US 7,001,928 B2

(12) United States Patent
Raje

(10) Patent No.: US 7,001,928 B2
(45) Date of Patent: Feb. 21, 2006

(54) SLURRY ACTIVATION OF FISCHER-TROPSCH CATALYST WITH CARBON MONOXIDE CO-FEED

(75) Inventor: Ajoy P. Raje, Stillwater, OK (US)

(73) Assignee: ConocoPhillips Company, Houston, TX (US)

( * ) Notice: Subject to any disclaimer, the term of this patent is extended or adjusted under 35 U.S.C. 154(b) by 166 days.

(21) Appl. No.: 10/667,637

(22) Filed: Sep. 22, 2003

(65) Prior Publication Data

US 2004/0127585 A1 Jul. 1, 2004

Related U.S. Application Data

(60) Provisional application No. 60/412,598, filed on Sep. 20, 2002.

(51) Int. Cl.
*C07C 27/00* (2006.01)
(52) U.S. Cl. .................. 518/709; 518/700; 518/720
(58) Field of Classification Search ............ 518/700, 518/709, 720
See application file for complete search history.

(56) References Cited

U.S. PATENT DOCUMENTS

| | | | |
|---|---|---|---|
| 2,540,109 A | 2/1951 | Friedman | |
| 2,608,568 A | 8/1952 | Hogan et al. | |
| 4,595,703 A | 6/1986 | Payne et al. | |
| 4,626,552 A | 12/1986 | Arcuri | |
| 4,738,948 A | 4/1988 | Iglesia et al. | |
| 4,822,824 A | 4/1989 | Iglesia et al. | |
| 5,260,239 A | 11/1993 | Hsia | |
| 5,389,690 A | 2/1995 | Mitchell | 518/700 |
| 5,728,918 A | 3/1998 | Nay et al. | |
| 5,958,986 A | 9/1999 | Mart et al. | |
| 6,022,755 A | 2/2000 | Kinnari et al. | |
| 6,043,288 A | 3/2000 | DeGeorge et al. | |
| 6,066,679 A | 5/2000 | Leviness et al. | |
| 6,147,126 A | 11/2000 | DeGeorge et al. | |
| 6,475,943 B1 | 11/2002 | Hoek et al. | 502/53 |
| 6,486,220 B1 | 11/2002 | Wright | |
| 6,703,430 B1 | 3/2004 | Culross | |
| 6,753,351 B1 | 6/2004 | Clark et al. | |

OTHER PUBLICATIONS

Jongsomjit, Bunjerd, et al; *Co-Support Compound Formation in Co/Al$_2$O$_3$ Catalysts: Effect of Reduction Gas Containing CO*: Catalysis Today 77 (2002) 191-204.

*Primary Examiner*—J. Parsa
(74) *Attorney, Agent, or Firm*—Conley Rose P.C.

(57) ABSTRACT

Methods and apparatus for improving the efficiency and effectiveness of in situ reduction of a Fischer-Tropsch catalyst slurry. The preferred embodiments of the present invention are characterized by a system that utilizes a co-feed of carbon monoxide along with the reducing gas into a reduction vessel maintained at an elevated temperature. As the metal oxide reduces to the active Fischer-Tropsch metal, the carbon monoxide acts as a poison to hydrogenolysis and reduces the loss of liquid from the slurry and the production of methane. The carbon monoxide is generally in parts-per-million quantities and will achieve the desired results in quantities less than 5,000 ppm, preferably less than 2,000 ppm.

30 Claims, 2 Drawing Sheets

Decrease in Slurry Level during Reduction for Example 1

Decrease in Slurry Level during Reduction for Example 2

SLURRY ACTIVATION OF FISCHER-TROPSCH CATALYST WITH CARBON MONOXIDE CO-FEED

CROSS-REFERENCE TO RELATED APPLICATIONS

The present application claims the benefit of 35 U.S.C. 111(b) Provisional Application Ser. No. 60/412,598 filed Sep. 20, 2002, and entitled "Slurry Activation and Regeneration of Fischer-Tropsch Catalyst With Carbon Monoxide Co-Feed," which is hereby incorporated by reference herein for all purposes.

STATEMENT REGARDING FEDERALLY SPONSORED RESEARCH OR DEVELOPMENT

Not applicable.

TECHNICAL FIELD OF THE INVENTION

The present invention relates generally to methods and apparatus for decreasing hydrogenolysis during the reduction of a catalyst slurry by feeding a stream of carbon monoxide to the slurry. More specifically, the present invention relates to methods and apparatus for co-feeding a stream of carbon monoxide into a Fischer-Tropsch catalyst slurry during high temperature reduction and/or regeneration in order to reduce hydrogenolysis in the slurry.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due, in part, to the large volume occupied by a gas. Because the volume of an amount of gas is so much greater than the volume of the same number of gas molecules in a liquefied state, the process of transporting natural gas typically includes chilling and/or pressurizing the natural gas in order to liquefy it. However, this contributes to the final cost of the natural gas and may not be economical.

Further, naturally occurring sources of crude oil used for liquid fuels such as gasoline, jet fuel, kerosene, and diesel fuel have been decreasing and supplies are not expected to meet demand in the coming years. Fuels that are liquid under standard atmospheric conditions have the advantage that, in addition to their value, they can be transported more easily than natural gas, since they do not require liquefaction. Thus, for all of the above-described reasons, there has been interest in developing technologies for converting natural gas to more readily transportable liquid fuels, i.e. to fuels that are liquid at standard temperatures and pressures.

One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is reacted with hydrogen to form organic molecules containing carbon and hydrogen. Those molecules containing only carbon and hydrogen are known as hydrocarbons. Those molecules containing oxygen in addition to carbon and hydrogen are known as oxygenates. Hydrocarbons having carbons linked in a straight chain are known as aliphatic hydrocarbons, which may include paraffins and/or olefins. Paraffins are particularly desirable as the basis of synthetic diesel fuel.

The Fischer-Tropsch process is commonly facilitated by a catalyst. Catalysts desirably have the function of increasing the rate of a reaction without being consumed by the reaction. Common catalysts for use in the Fischer-Tropsch process contain at least one metal from Groups 8, 9, or 10 of the Periodic Table (in the new IUPAC notation, which is used throughout the present specification). The molecules react to form hydrocarbons while confined on the surface of the catalyst. The hydrocarbon products then desorb from the catalyst and can be collected. H. Schulz (Applied Catalysis A: General 1999, 186, p 3) gives an overview of trends in Fischer-Tropsch catalysis.

The catalyst may be contacted with synthesis gas in a variety of reaction zones that may include one or more reactors. Common reactors include packed bed (also termed fixed bed) reactors, fluidized bed reactors, and slurry bed reactors. Originally, the Fischer-Tropsch synthesis was carried out in packed bed reactors. These reactors have several drawbacks, such as temperature control, that can be overcome by fluidized bed reactors or gas-agitated slurry bed reactors. Fluidized bed reactors, which operate by fluidizing catalytic particles in a gas phase, are typically employed for high-temperature Fischer-Tropsch synthesis. Gas-agitated multiphase reactors sometimes called "slurry bed reactors", "slurry phase reactor", or "slurry bubble columns," operate by suspending catalytic particles in liquid and feeding gas reactants into the bottom of the reactor through a gas distributor, which produces gas bubbles. This type of slurry reactors is preferably used for low-temperature Fischer-Tropsch synthesis, when the reactor temperature is typically between 190° C. and 280° C.

As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques such as filtration, settling, hydrocyclones, magnetic techniques, etc. Gas-agitated multiphase reactors, or slurry bubble column reactors, inherently have very high heat transfer rates, and therefore, reduced reactor cost. This, and the ability to remove and add catalyst online, are some of the principal advantages of such reactors as applied to the exothermic Fischer-Tropsch synthesis. Sie and Krishna (Applied Catalysis A: General 1999, 186, p. 55) give a history of the development of various Fischer Tropsch reactors.

Typically the Fischer-Tropsch product stream contains hydrocarbons having a range of numbers of carbon atoms, and thus having a range of molecular weights. Thus, the Fischer-Tropsch products produced by conversion of synthesis gas commonly contains a range of hydrocarbons including gases, liquids and waxes. It is highly desirable to maximize the production of high-value liquid hydrocarbons, such as hydrocarbons with at least 5 carbon atoms per hydrocarbon ($C_{5+}$ hydrocarbons).

The composition of a catalyst influences the relative amounts of hydrocarbons obtained from a Fischer-Tropsch catalytic process. Cobalt metal is particularly desirable in catalysts used in converting natural gas to hydrocarbons suitable for the production of diesel fuel. Further, iron, nickel, and ruthenium have been used in Fischer-Tropsch catalysts. Nickel catalysts favor termination and are useful for aiding the selective production of methane from syngas. Iron has the advantage of being readily available and relatively inexpensive, but the disadvantage of a high water-gas shift activity. Ruthenium has the advantage of high activity but is quite expensive.

Regardless of the particular metal being used, the catalyst is often supplied in a partially oxidized form. Thus, it is often desired to subject the Fischer-Tropsch catalyst to an initial reduction before the catalyst is used in a Fischer-Tropsch reactor so as to improve the initial selectivity and activity of the catalyst. The selectivity and activity of a typical Fischer-Tropsch catalyst will also, due to a number of factors, deteriorate over time. Thus, it is often desired to regenerate, or re-reduce, the catalyst periodically. The catalyst can be reduced/regenerated by exposure to a stream of hydrogen, or some other, gas.

It is often preferred to carry out the reduction process at an elevated temperature relative to the Fischer-Tropsch reactor temperature. At the preferred reduction temperatures, normally between 300 and 400° C., the reduction process may be susceptible to hydrogenolysis. Hydrogenolysis is generally defined as the breaking of a bond between two atoms in a molecule forming two product molecules, accompanied by hydrogen addition to each product molecule. More specifically, hydrogenolysis of hydrocarbons is defined as the breaking of a bond between two carbon atoms in a hydrocarbon molecule by reaction with hydrogen gas to give molecules with a reduced number of carbon atoms. Hydrogenolysis occurs in many chemical processes that produce useful products. G.C. Bond ("Catalysis by Metals", Academic Press, New York, 1962) gives an overview and further details about hydrogenolysis. Typical Fischer-Tropsch catalytic metals such as cobalt, nickel, iron and ruthenium are also good hydrogenolysis catalysts. The breaking of the carbon-carbon bond over these metals typically occurs at a terminal carbon atom and results in the formation of methane. Whereas some processes take advantage of hydrogenolysis, it can be detrimental to a Fischer-Tropsch slurry.

Hydrogenolysis taking place in a Fischer-Tropsch slurry will tend to break down the heavy hydrocarbons in the slurry into lighter components and will also produce methane. This tends to lead to a loss of slurry liquid from the reaction vessel due to both methane formation and due to vaporization of the lighter components. The loss in liquid contributes to higher slurry viscosity, higher water concentrations in the slurry, and lower contact time between the reducing gas and the catalyst. The above factors can cause a loss of reduction efficiency of the metal oxide leading to lower syngas conversion rates during the Fischer-Tropsch process.

In order to minimize the effects of hydrogenolysis, Fischer-Tropsch catalyst reduction is conventionally performed either with the catalyst not in a slurry or at reduced temperatures that do not promote hydrogenolysis. Although initial reduction can be carried out before adding the catalyst to a slurry, it is not preferred because it adds additional processing steps and requires dedicated equipment. Similarly, separating the catalyst from a slurry for regeneration is difficult and also adds complexity and cost to the Fischer-Tropsch process. Carrying out regeneration or reduction at lower temperatures requires high amounts of noble metals in the catalyst, which adds to the cost of the catalyst.

Thus, there remains a need in the art for methods and apparatus to improve the efficiency and effectiveness of in situ catalyst reduction and/or regeneration processes. Therefore, the embodiments of the present invention are directed to methods and apparatus for constructing and operating a reduction system that seek to overcome these and other limitations of the prior art.

SUMMARY OF THE PREFERRED EMBODIMENTS

Accordingly, there are provided herein methods and apparatus for improving the efficiency and effectiveness of in situ reduction and/or regeneration of a Fischer-Tropsch catalyst slurry. The preferred embodiments of the present invention are characterized by a system that utilizes a co-feed of carbon monoxide and a reducing gas into a reduction vessel. Though not wishing to be bound by any theory, it is postulated that as the metal oxide reduces to the active Fischer-Tropsch metal, the carbon monoxide acts as a poison for hydrogenolysis and reduces the loss of slurry and the production of methane during the reduction.

One embodiment includes contacting a Fischer-Tropsch slurry with a reducing gas, such as hydrogen or a hydrogen rich gas, co-fed with a small amount of carbon monoxide. The reducing process is carried out at temperatures preferably between 250 and 400° C. At the preferred temperatures, catalyst reduction takes place at an efficient level and the effects of hydrogenolysis are reduced by the small amount of carbon monoxide. The concentration of carbon monoxide is preferably between 1 to 5,000 ppm (by volume) in the gas feed during reduction and more preferably between 1 to 2,000 ppm.

The preferred embodiments of the invention relate particularly to a method for decreasing hydrogenolysis during reduction of a slurry containing an oxidized metal catalyst, comprising: (a) providing a slurry containing a catalyst comprising an oxidized metal and a liquid comprising organic compounds; (b) contacting at least a portion of the slurry with a reducing gas in a reduction vessel along with carbon monoxide, wherein the carbon monoxide is in an amount sufficient to decrease hydrogenolysis of at least a fraction of the organic compounds; (d) reducing at least a portion of the oxidized metal in the catalyst with at least a portion of the reducing gas to form a catalytic active catalyst. The reducing gas contains hydrogen, and preferably has a hydrogen concentration sufficient to reduce at least a portion of oxidized catalytic metal to a catalytically active metal. The liquid containing organic compounds could comprise a pure compound in a liquid form, but may it preferably comprise a hydrocarbonaceous mixture. In some embodiments, the liquid containing organic compounds comprises products from a hydrocarbon synthesis reactor such as a Fischer-Tropsch reactor and/or a paraffinic oil, such as a basestock for lubricating oils.

The embodiments of the present invention may be used in a batch, semi-batch, or continuous reduction/regeneration process that includes moving the slurry from a reactor vessel to a regenerating vessel, regenerating the catalyst, and moving the catalyst to the reactor vessel from the regenerating vessel. The catalyst may also be reduced/regenerated within the reactor vessel itself by cycling between a reduction/regeneration mode and a reaction mode.

Thus, the present invention comprises a combination of features and advantages that enable it to reduce or regenerate a slurry-based Fischer-Tropsch catalyst at high temperatures with reduced hydrogenolysis. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures.

DETAILED DESCRIPTION OF THE PREFERRED EMBODIMENTS

Figure 1:
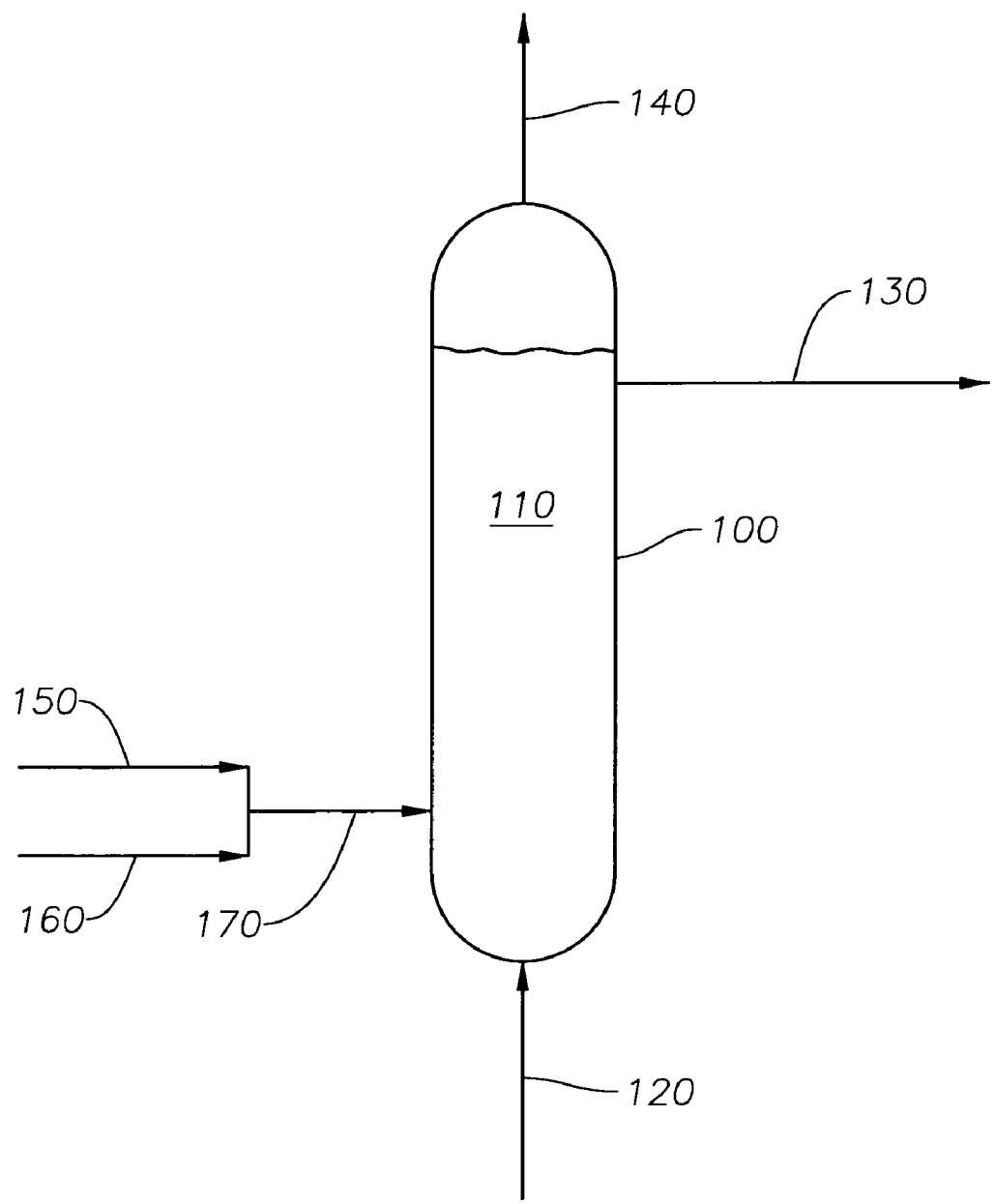
FIG. 1 is a schematic representation of a simple catalyst reduction/regeneration system.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for decreasing hydrogenolysis during the reduction and/or regeneration of a catalyst slurry. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. For example, the temperatures and pressures described herein are merely representative temperatures and pressures of one particular Fischer-Tropsch process and, except where expressly claimed, are not intended to limit the possible temperatures and pressures at which the embodiments of the present invention may find utility.

In particular, various embodiments of the present invention provide a number of different methods and apparatus for reducing or regenerating a catalyst suspended in a slurry. Reference is made to a Fischer-Tropsch catalyst and reaction, but the use of the concepts of the present invention is not limited to Fischer-Tropsch technology and can be used with any other catalyst system that requires reduction or periodic catalyst regeneration. It is to be fully recognized that the different teachings of the embodiments discussed below may be employed separately or in any suitable combination to produce desired results.

In the following discussion, the term reducing is used generically to indicate the process whereby metal oxides are reduced to active metals. It is to be understood that reduction of the catalyst may be undertaken at any desirable point in the life of the catalyst in particular in the context of an initial reduction before being used in order to improve the activity or selectivity of the catalyst. The preferred embodiments of the current invention can be utilized for any process that involves reduction or is subject to undesired hydrogenolysis. Regeneration refers generally to the process of reducing the catalyst after a period of use in order to improve the selectivity or activity of the catalyst.

FIG. 1 shows a reduction and/or regeneration vessel 100 containing a catalyst and wax slurry 110. Vessel 100 includes slurry inlet 120, slurry outlet 130, gas outlet 140, hydrogen supply 150, and carbon monoxide supply 160. For purposes of discussion, reduction/regeneration vessel 100 will be described as a vessel separate from the Fischer-Tropsch reactor for the batch, semi-batch, or continuous regeneration of catalyst. A vessel 100 comprises a slurry 110, a slurry supply 120, a gas feed 170, a slurry outlet 130, and a gas outlet 140. Slurry supply 120 is fed, either mechanically or by a pressure differential, into vessel 100.

The suitable temperature range for the reduction is preferably between 250° C. and 400° C.; more perferably between 300° C. and 400° C.; and still more perferably between 350° C. and 400° C. Vessel 100 may further comprise a temperature-controlling means (not illustrated). The temperature-controlling means of vessel 100 may comprise internal heat transfer elements such as heating/cooling coils that may circulate a heat transfer medium such as, but not limited to, water or steam, so that slurry 110 can be maintained at a desired temperature within a temperature range suitable for effective reduction. The temperature-controlling means is sufficient to bring the temperature of slurry 110 to the desired temperature as well as to maintain the temperature of slurry 110. A reducing gas containing hydrogen ($H_2$) is fed into slurry 110 from hydrogen supply 150 via gas feed 170, while a gas containing carbon monoxide (CO) is fed from CO supply 160 via gas feed 170. FIG. 1 shows supplies 150 and 160 being mixed before entering vessel 100, but it is also understood that supplies 150 and 160 may enter vessel 100 as separate streams. It is envisioned that hydrogen supply 150 may already comprise some amount of CO. Therefore, it is possible that the CO content of the hydrogen supply 150 could be measured, and the flow of CO supply 160 be adjusted so as to achieve a desirable CO content in gas feed 170. Alternatively, if the CO content in the hydrogen supply 150 is above the maximum desirable concentration, then it is envisioned that an additional gas such as an inert gas, natural gas, methane, or combinations could be added to gas feed 170 to lower the CO content of gas feed 170 to a more desirable CO level (i.e., below the maximum CO content acceptable to minimize hydrogenolysis).

Although not illustrated in the FIG. 1, a make-up liquid stream (not shown) can be added to vessel 100 either continuously or intermittently to replace possible loss of liquid from vessel 100 due to vaporization. The make-up liquid stream preferably comprises hydrocarbons; more preferably paraffinic hydrocarbons. In some embodiments, the make-up liquid stream comprises a molten wax, a paraffinic oil, or a base oil comprising no or substantially low amounts of aromatic compounds, polar compounds and sulfur compounds, or combinations thereof. This make-up liquid stream can be mixed with slurry supply 120 or can be added to vessel 100 directly.

The CO may be supplied from any source. Preferable sources of CO may include syngas, tail gas from a Fischer-Tropsch reactor, which is the uncondensed portion of the reactor outlet gas, or any other convenient source of CO. The reducing gas containing hydrogen should have a hydrogen content between about 1 vol % to about 100 vol %. The reducing gas is preferably a substantially pure hydrogen gas but may also be a hydrogen-rich gas with at least about 50 vol % comprising hydrogen from any source. The reducing gas comprising hydrogen may come from a source within the hydrocarbon synthesis facility or may be imported from elsewhere. Typical sources of hydrogen may be obtained by physical and/or chemical hydrogen enrichment or purification means from a synthesis gas source, from an olefin manufacturing process, from a process for converting hydrocarbons to aromatics; and from a process for converting hydrocarbons to carbon filaments. Physical hydrogen enrichment/purification means from synthesis gas may be performed by membrane separation, pressure swing absorption, or combination thereof, whereas chemical hydrogen enrichment means may comprise a water gas shift reaction, a reforming reaction, or combination, to produce a hydrogen-rich stream.

In some embodiments, a gas comprising mostly hydrogen from the hydrocarbon synthesis facility itself and/or from a hydroprocessing facility placed downstream of the hydrocarbon synthesis facility can be used in this catalyst reduction step, and can make up at least a portion of the reducing gas. The reducing gas comprising hydrogen may further comprise nitrogen, carbon dioxide, any $C_1$–$C_5$ light hydrocarbon, natural gas, any inert gas, and mixtures thereof. In preferred embodiments, the gas feed 170 as shown in the FIG. 1 comprises a majority of hydrogen (more than 50 vol %) and small amount of carbon monoxide (less than 0.5 vol %). Other gases may also prove suitable for supporting catalyst reduction as long as some carbon monoxide is supplied to counteract hydrogenolysis.

The CO and $H_2$ are injected into the slurry in such proportions so that the $H_2$ reduces at least a portion of the oxidized metals to their active forms, preferably a substantial portion of the oxidized metals, and so that the CO acts as a poison to hydrogenolysis of organic compounds (such as hydrocarbons) present in the catalyst slurry. The amount of CO injected into the slurry will depend on the composition of the slurry, the weight fraction of catalyst in the slurry, and the expected level of hydrogenolysis for the given catalyst. The content of CO required to sufficiently decrease the rate of the hygrogenolysis reaction during reduction is at least 1 ppm, and less than 5,000 ppm (by volume). Preferably, the catalyst slurry is exposed to a CO concentration between 1 ppm and 2,000 ppm. In some embodiments, the concentration of carbon monoxide is between 1 ppm and 500 ppm, or even between 1 ppm and 200 ppm.

Using an excessive amount of CO at high reduction temperatures may have adverse effects on the Fischer-Tropsch catalyst. For instance, the CO may react with hydrogen to form hydrocarbons and water. High concentrations of CO will lead to high concentrations of water, which is known to be detrimental to the efficient reduction of the catalyst, because water can cause oxidation of a metal in a zero-valent oxidation state. In addition, excessive amounts of CO at high reduction temperatures may cause carbon deposition on the catalyst surface and/or may form metal carbides comprising the catalytic metal, thereby decreasing the amount of catalytic metal available for hydrocarbon synthesis.

Another embodiment of this invention covers a process for activating a slurry comprising a metal catalyst and organic compounds while minimizing hydrogenolysis of the organic compounds during activation and producing hydrocarbons from synthesis gas using the activated slurry. This process comprises (a) providing a catalyst slurry containing a catalyst and a liquid comprising organic compounds, wherein the catalyst comprises an oxidized catalytic metal; (b) contacting the catalyst slurry with a reducing gas; (c) simultaneously to step (b), contacting the catalyst slurry with carbon monoxide in an amount sufficient to minimize hydrogenolysis of at least a fraction of the organic compounds; (d) reducing at least a portion of the oxidized catalytic metal in the catalyst with at least a portion of the reducing gas to form a reduced catalyst and to generate an activated catalyst slurry comprising the reduced catalyst; and (e) converting at least a portion of a gas feed comprising synthesis gas with at least a portion of the activated slurry comprising the reduced catalyst to form a product stream comprising hydrocarbons in a synthesis reactor.

The reduction in step (d) is performed at a temperature between 250 and 400° C., preferably at a temperature between 300 and 400° C.; and more preferably between 340 and 400° C. The reducing gas comprises hydrogen. The reducing gas may further comprise at least one gas selected form the group consisting of a gaseous hydrocarbon with less than 5 carbon atoms, such as methane and natural gas. In step (c), the catalyst slurry is contacted with carbon monoxide at a concentration between 1 ppm and 5,000 ppm; preferably at a concentration between 1 ppm and 2,000 ppm. In some embodiments, the carbon monoxide concentration is between about 1 ppm and about 500 ppm. In some preferred embodiments, the reducing gas comprising hydrogen also comprises carbon monoxide, wherein the CO concentration in the reducing gas is less than 5,000 ppm.

The reducing step can be done in a reduction vessel or the hydrocarbon synthesis reactor. When the reduction step is done in a reduction vessel, the process may further comprise transferring the portion of activated slurry from the reduction vessel to the hydrocarbon synthesis reactor. The transfer can be in a continuous mode or an intermittent mode. The transfer can be performed while the hydrocarbon synthesis reactor is operational, or before it is operational. In some embodiment, the activated slurry is transferred entirely in the hydrocarbon synthesis reactor.

This invention further relates to a re-activation, rejuvenation, or regeneration method for a catalyst slurry comprising hydrocarbons and catalyst, in which the catalyst slurry is contacted to a reducing gas comprising hydrogen, and simultaneously to a small amount of CO during regeneration, wherein the amount of CO is sufficient to minimize the hydrogenolysis of the hydrocarbons by hydrogen. Specifically, the method comprises: reacting synthesis gas with a catalyst comprising a catalytically active metal to form hydrocarbons and product water in a synthesis reactor comprising a slurry, wherein the slurry contains the catalyst, product water, and the hydrocarbons; converting at least a portion of the catalytically active metal to an oxidized catalytic metal simultaneously with reaction to form a partially deactivated slurry; contacting at least a portion of the partially deactivated slurry with a reducing gas in a reduction vessel along with carbon monoxide in an amount sufficient to decrease hydrogenolysis of at least a fraction of the organic compounds; reducing at least a portion of the oxidized metal in the catalyst with at least a portion of the reducing gas to a catalytic active metal to form an activated catalyst slurry; and recycling partially or totally the activated slurry to the synthesis reactor.

Although the oxidized metal may be derived from one or more of many metal-containing compounds, preferably the catalyst comprises a catalytic metal oxide. Preferably, the catalytic metal oxide comprises a catalytic metal from Groups 8, 9, 10, or combinations thereof. More preferably, the catalytic metal oxide comprises at least one metal selected from the group consisting of cobalt, iron, ruthenium, nickel, and any combination thereof. Most preferably, the catalytic metal oxide comprises cobalt.

Reduction of the catalyst comprising an oxidized catalytic metal provides a reduced catalyst that is activated for hydrocarbon synthesis. The primary catalytic metal of the reduced catalyst is the reduced form of the catalytic metal oxide described above. The reduced catalyst may further comprise at least one promoter suitable for increasing the selectivity, stability, and/or activity of the reduced catalyst. Suitable promoters are preferably selected from ruthenium, rhenium, platinum, palladium, boron, manganese, silver, lithium, sodium, copper, potassium, or any combination thereof. The reduced catalyst may be supported or unsupported.

Although described as being used for catalyst reduction in a separate vessel, the above described embodiments could be adapted for use in reducing catalysts within the slurry reactor, obviating the need to move the slurry for reduction. Alternate embodiments may also be used to reduce catalysts contained in fixed bed, ebullated bed, or any other type catalyst suspension system.

One preferred embodiment of this method relates to a reduction of a catalyst slurry and its use in a hydrocarbon synthesis reactor, to produce hydrocarbons from a reactant gas. The hydrocarbon synthesis reactor preferably comprises the Fischer-Tropsch synthesis, and therefore is called a Fischer-Tropsch reactor. The reactant gas, fed to the Fischer-Tropsch reactor, comprises a mixture of hydrogen ($H_2$) and carbon monoxide (CO), called synthesis gas or syngas. $H_2$/CO mixtures suitable as a feedstock for conversion to hydrocarbons can be obtained from light hydrocarbons, such as methane or hydrocarbons comprised in natural gas, by means of steam reforming, auto-thermal reforming, dry reforming, advanced gas heated reforming, partial oxidation, catalytic partial oxidation, or other processes known in the art. Alternatively, $H_2$/CO mixtures can be obtained from biomass and/or from coal by gasification. In addition, the reactant gas can comprise off-gas recycle from the present or another Fischer-Tropsch reactor.

Preferably, the hydrogen is provided by free hydrogen, although some Fischer-Tropsch catalysts have sufficient water gas shift activity to convert some water and carbon monoxide to hydrogen and carbon dioxide for use in the Fischer-Tropsch process. It is preferred that the molar ratio of hydrogen to carbon monoxide in the feed be greater than 0.5:1 (e.g., from about 0.67 to about 2.5). Preferably, the reactant gas contains hydrogen and carbon monoxide in a molar ratio of about 1.4:1 to about 2.3:1. The reactant gas may also contain carbon dioxide. The reactant gas stream should contain only a low concentration of compounds or elements that have a deleterious effect on the catalyst, such as poisons. For example, the reactant gas may need to be pretreated to ensure that it contains low concentrations of sulfur or nitrogen compounds such as hydrogen sulfide, hydrogen cyanide, ammonia, and carbonyl sulfides.

The reactant gas is contacted with the activated catalyst slurry in a reaction zone. Mechanical arrangements of conventional design may be employed as the reaction zone including, for example, fluidized bed, slurry bubble column or ebullating bed reactors, among others. Accordingly, the preferred size and physical form of the catalyst particles may vary depending on the reactor in which they are to be used.

The Fischer-Tropsch reactor is typically run in a continuous mode. In this mode, the reactant gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where the reaction takes place and which is occupied by a gaseous phase comprising reactants, products and/or inert gases; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions with temperatures from about 190° C. to about 260° C.; more preferably from about 205° C. to about 230° C. The reaction zone pressure is typically in the range of about 80 psia (552 kPa) to about 1000 psia (6895 kPa), more preferably from 80 psia (552 kPa) to about 800 psia (5515 kPa), and still more preferably, from about 140 psia (965 kPa) to about 750 psia (5170 kPa). Most preferably, the reaction zone pressure is from about 250 psia (1720 kPa) to about 650 psia (4480 kPa).

The embodiments set forth herein and the examples below are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

EXAMPLES

The following examples illustrate the effect of carbon monoxide in decreasing the rate of hydrogenolysis during the reduction of a catalyst slurry. The reduction of the catalyst slurry was carried out in a 600-ml stirred tank vessel provided with temperature and pressure controlling means. The composition of the gas exiting the vessel was periodically analyzed by a gas chromatograph. Typically two-thirds of the vessel is initially filled with the catalyst slurry.

The vessel further comprised a slurry-level monitoring means by the use of a multi-point thermocouple arranged vertically in the vessel. One point of the multi-point thermocouple was situated near the bottom of the vessel and measured the temperature of the catalyst slurry. Another point was situated at the top of the vessel and measured the temperature of the gas phase above the slurry. There was typically a 70° F. difference in temperature between the catalyst slurry and the gas phase above the slurry. A third point was situated at the (initial) gas-slurry interface at approximately two-thirds of the vessel height. If this point measured the same temperature as that at the bottom of the vessel, then the slurry level was at least at two-third of vessel height. If this point measured a temperature less than the temperature at the vessel bottom, then the slurry level was below two-thirds of the vessel height. The relative magnitude of the temperature difference compared to the temperature at the vessel bottom was used as an indication if the slurry level was at an elevation below two-thirds of the vessel height.

Example 1

A 2.2-gram sample of a cobalt-based Fischer-Tropsch catalyst in the oxide form was loaded into the 600-ml stirred tank vessel with about 180 grams of a hydrocarbon oil to form a catalyst slurry in the vessel. The hydrocarbon oil was a neutralized base oil (typically used for lubricants manufacture) consisting of branched and straight chain paraffins with an average of 35 carbon atoms per molecule and an average molecular weight of 492 grams/mol. The base oil used in Example 1 was a base oil under the Registered Trademark of PURE PERFORMANCE® 600N from ConocoPhillips Company (Houston, Tex.). The cobalt-based Fischer-Tropsch catalyst comprised particles with an average particle size of about 70 microns. The catalyst was prepared by an impregnation technique followed by calcination to yield a catalyst composition of about 25 wt % cobalt and small amounts (<1 wt %) of promoters. Hydrogen was used as the reducing gas at a flow rate of 300 standard cubic centimeters per minute (sccm) and the pressure in the vessel was maintained at 60 psig (about 516 kPa).

The catalyst slurry was heated in the vessel to the desired reduction temperature of 662° F. (350° C.) using the following heating rate: heating from ambient temperature to a temperature of 240° F. (115° C.) at 2° F./min, holding at 240° F. for one hour, and heating from 240° F. to 662° F. at 2° F./min. The catalyst slurry was then maintained at 662° F. for about 18 hours.

The measured flow rate of the gas exiting the vessel was 300 sccm, and the composition of the exit gas was 4.2 mole percent methane (with the balance being hydrogen) during the 18-hour period, when the temperature was held at 662° F. The presence of methane at the exit gas indicated that hydrogenolysis of the hydrocarbon oil was taking place. The ratio of the moles of methane produced per mole of hydrocarbon oil loaded into the vessel was used to quantify the extent of hydrogenolysis of the hydrocarbon oil. Since, methane was observed in the vessel exit gas at 4.2 mole percent with the total exit gas flow rate at 300 sccm, 0.61 moles of methane were produced in the 18-hour period at 662° F. The total amount of moles of hydrocarbon oil, initially, loaded in the vessel was 0.37 mole. Hence, the extent of hydrogenolysis was 1.64 moles of methane produced per mole of hydrocarbon oil loaded. It should be noted that a low weight fraction of catalyst in the slurry (1.2 weight percent) was used in this Example 1. It is expected that the extent of hydrogenolysis would be even higher for commercially suitable catalyst weight fractions in catalyst slurries, which typically comprise between about 20 to 40 weight percent catalyst in the total slurry weight.

Figure 2:
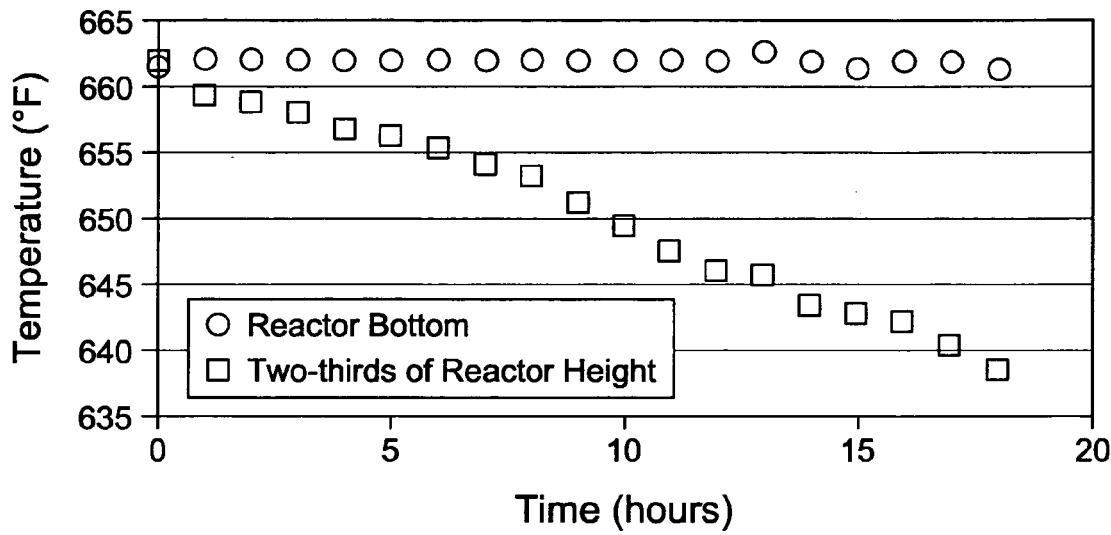
FIG. 2 is a graphical illustration of the loss of slurry in a reduction vessel over time with a reducing gas comprising hydrogen and no carbon monoxide wherein the difference in temperatures at different elevations in the reduction vessel is used as an indication of slurry level.

Another evidence of hydrogenolysis of the start-up hydrocarbon oil is shown in FIG. 2. FIG. 2 shows the temperature of the thermocouple point at the vessel bottom (catalyst slurry temperature) and of the thermocouple point at two-thirds of vessel height versus reduction time during the 18-hour time period at 662° F. As shown in FIG. 2, the temperature of the thermocouple point at two-thirds of vessel height decreased during the 18-hr time period at 662° F., even though the temperature at the vessel bottom (catalyst slurry) stayed at 662° F. The final temperature at two-thirds of vessel height at the end of the 18-hour time period was 638° F. (337° C.), i.e., 24° F. below that of the catalyst slurry. Hence, there was a loss in the catalyst slurry weight and a decrease in the catalyst slurry level in the vessel during reduction.

Example 2

A 2.2-gram sample of the same cobalt-based Fischer-Tropsch catalyst in the oxide form as used in Example 1 was loaded into the 600-ml stirred tank vessel with 180 grams of hydrocarbon oil (same oil as in Example 1) to form the catalyst slurry. The reducing gas used in this Example 2 was a hydrogen gas containing 500 ppm by volume of carbon monoxide. Similar to Example 1, the reducing gas was used at a flow rate of 300 standard cubic centimeters per minute (sccm), and the pressure in the vessel was maintained at 60 psig.

The catalyst slurry was heated to the desired reduction temperature of 662° F. (350° C.) using the same heating rate as in Example 1: heating from ambient temperature to 240° F. at 2° F./min, holding at 240° F. for one hour, and heating from 240° F. to 662° F. at 2° F./min. The catalyst slurry was maintained at 662° F. for 18 hours.

The measured gas flow rate at the vessel exit was 300 sccm. The composition of the exit gas was 1.6 mole percent methane (with the balance being hydrogen) during the 18-hour period when the temperature was maintained at 662° F. The value of methane mole percent for Example 2 was about 60% less than that obtained for Example 1 using only hydrogen (no carbon monoxide) as the reducing gas. Thus, since the amount of methane in the exit gas is evidence of hydrogenolysis of the hydrocarbon oil, there was a decrease in the hydrogenolysis of the hydrocarbon oil when 500 ppm carbon monoxide was used with the reducing gas. The extent of hydrogenolysis (ratio of the moles of methane produced per mole of hydrocarbon oil loaded into the vessel) in Example 2 was 0.63 moles of methane produced per mole of hydrocarbon oil loaded. Hence, the extent of hydrogenolysis was reduced by about 60% with the use of 500 ppm of carbon monoxide.

Figure 3:
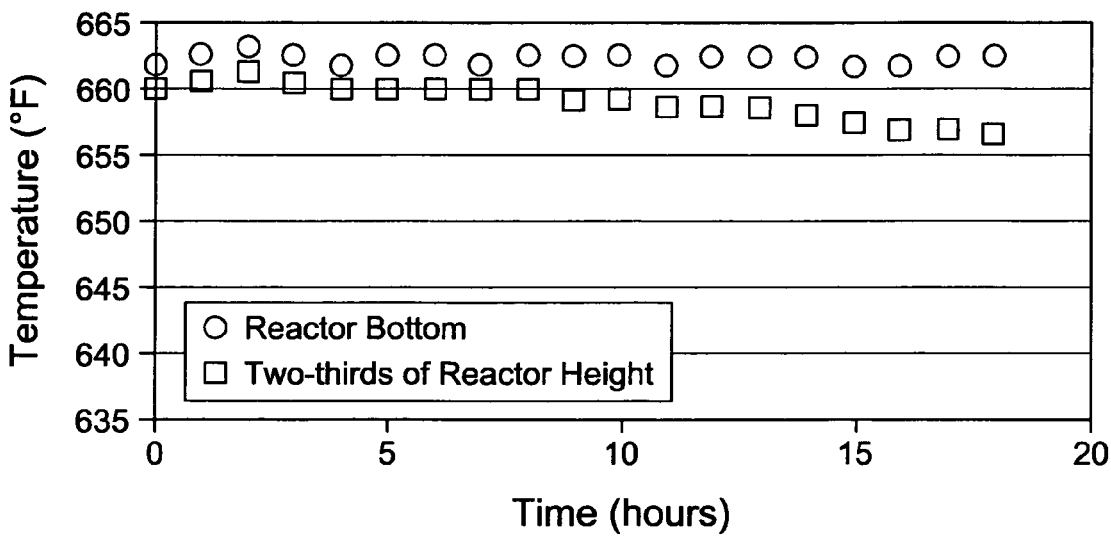
FIG. 3 is a graphical illustration of the loss of slurry in a reduction vessel over time with a reducing gas comprising hydrogen and about 500 ppm of carbon monoxide.

FIG. 3 represents the temperature of the thermocouple point at the vessel bottom (catalyst slurry temperature) and of the thermocouple point at two-thirds of vessel height versus reduction time during the 18-hour time period at 662° F. The decrease in temperature at two-thirds of vessel height was much smaller during the time period at 662° F. when using 500 ppm carbon monoxide in the reducing gas than in the absence of carbon monoxide. The final temperature at two-thirds of vessel height at the end of the 18-hour time period was 657° F. (347° C.), i.e., only 5° F. (versus 24° F. in Example 1) below that of the catalyst slurry. Hence, the presence of 500 ppm of carbon monoxide during the catalyst reduction decreased the weight loss of catalyst slurry level and therefore resulted in a better maintenance of the slurry level in the vessel during reduction.

What is claimed is:

1. A method for decreasing hydrogenolysis during reduction of a slurry containing an oxidized metal catalyst, comprising:
   providing a slurry containing a catalyst comprising an oxidized metal and a liquid comprising organic compounds;
   contacting at least a portion of the slurry with a reducing gas in a reduction vessel along with carbon monoxide at a concentration between 1 ppm and 5,000 ppm so as to decrease hydrogenolysis of at least a fraction of said organic compounds; and
   reducing at least a portion of the oxidized metal in the catalyst with at least a portion of said reducing gas to form a catalytic active catalyst.

2. The method of claim 1 wherein the reduction step is performed at a temperature between 250 and 400° C.

3. The method of claim 1 wherein the reduction step is performed at a temperature between 300 and 400° C.

4. The method of claim 1 wherein the reduction step is performed at a temperature between 350 and 400° C.

5. The method of claim 1 wherein the reducing gas contains hydrogen.

6. The method of claim 5 wherein the reducing gas has a hydrogen concentration sufficient to reduce at least a portion of oxidized catalytic metal to a catalytically active metal.

7. The method of claim 5 wherein the reducing gas further comprises at least one gas selected from the group consisting of any $C_1$–$C_5$ light hydrocarbon and mixtures thereof.

8. The method of claim 1 wherein the catalyst slurry is contacted with carbon monoxide at a concentration between 1 ppm and 2,000 ppm.

9. The method of claim 1 wherein the catalyst slurry is contacted with carbon monoxide at a concentration between 1 ppm and 500 ppm.

10. The method of claim 1 wherein the portion of said slurry is disposed continuously in the reduction vessel.

11. The method of claim 1 wherein the portion of said the slurry is disposed intermittently in the reduction vessel.

12. A process for activating a slurry comprising an oxidized metal catalyst and organic compounds while minimizing hydrogenolysis of said organic compounds and producing hydrocarbons from synthesis gas using said activated slurry, comprising:
(a) providing a catalyst slurry containing a catalyst and a liquid comprising organic compounds, wherein the catalyst comprises an oxidized catalytic metal;
(b) contacting the catalyst slurry to a reducing gas along with carbon monoxide at a concentration between 1 ppm and 5,000 ppm so as to minimize hydrogenolysis of at least a fraction of said organic compounds;
(c) reducing at least a portion of the oxidized catalytic metal in the catalyst with at least a portion of said reducing gas to form a reduced catalyst and to generate an activated catalyst slurry comprising said reduced catalyst; and
(d) converting at least a portion of a gas feed comprising synthesis gas with at least a portion of said activated slurry comprising said reduced catalyst to form a product stream comprising hydrocarbons in a synthesis reactor.

13. The process of claim 12 wherein the reduction in step (c) is performed at a temperature between 250 and 400° C.

14. The process of claim 12 wherein the reduction in step (c) is performed at a temperature between 300 and 400° C.

15. The process of claim 12 wherein the reduction in step (c) is performed at a temperature between 350 and 400° C.

16. The process of claim 12 wherein the reducing gas contains hydrogen.

17. The process of claim 16 wherein the reducing gas further comprises at least one gas selected from the group consisting of any $C_1$–$C_5$ light hydrocarbon and mixtures thereof.

18. The process of claim 12 wherein the catalyst slurry is contacted with carbon monoxide at a concentration between 1 ppm and 2,000 ppm.

19. The process of claim 12 wherein the catalyst slurry is contacted with carbon monoxide at a concentration between 1 ppm and 500 ppm.

20. The process of claimy 12 wherein the reducing step is done in a reduction vessel.

21. The process of claim 20 further comprising transferring said portion of activated slurry from the reduction vessel to the hydrocarbon synthesis reactor.

22. The process of claim 21 wherein the transfer is performed while the hydrocarbon synthesis reactor is operational.

23. The process of claim 22 wherein the portion of said activated slurry is continuously added to the operational hydrocarbon synthesis reactor.

24. The process of claim 22 wherein the portion of said activated slurry is intermittently added to the operational hydrocarbon synthesis reactor.

25. The process of claim 22 wherein the transfer is performed before the hydrocarbon synthesis reactor is operational.

26. The process of claim 22 wherein the activated slurry is transferred entirely in the hydrocarbon synthesis reactor.

27. The process of claim 16 wherein the reducing step is done in the hydrocarbon synthesis reactor.

28. A method for producing hydrocarbons from synthesis gas with a catalyst slurry and regenerating a spent catalyst slurry, comprising:
reacting synthesis gas with a catalyst comprising a catalytically active metal to form hydrocarbons and product water in a synthesis reactor comprising a slurry, wherein the slurry contains said catalyst and said hydrocarbons;
converting at least a portion of said catalytically active metal to a partially oxidized catalytic metal simultaneously with reaction to form a partially deactivated slurry;
contacting at least a portion of the partially deactivated slurry with a reducing gas along with carbon monoxide in a reduction vessel at a concentration between 1 ppm and 5,000 ppm so as to decrease hydrogenolysis of at least a fraction of said organic compounds;
reducing at least a portion of the oxidized metal in the catalyst with at least a portion of said reducing gas to a catalytic active metal to form an activated catalyst slurry; and
recycling partially or totally said activated slurry to the synthesis reactor.

29. The method of claim 5 wherein the reducing gas further comprises at least one gas selected from the group consisting of methane and natural gas.

30. The method of claim 16 wherein the reducing gas further comprises at least one gas selected from the group consisting of methane and natural gas.

* * * * *